United States Patent [19]

Tanino et al.

[11] Patent Number: 4,808,326

[45] Date of Patent: Feb. 28, 1989

[54] RESIN-BONDED MAGNETIC COMPOSITION AND PROCESS FOR PRODUCING MAGNETIC MOLDING THEREFROM

[75] Inventors: Katsumi Tanino, Takaoka; Yukio Nakazawa; Takeo Kizaki, both of Toyama, all of Japan

[73] Assignees: Takeuchi Press Industries Co., Ltd.; Toyama Prefecture, both of Toyama, Japan

[21] Appl. No.: 26,369

[22] PCT Filed: Jun. 9, 1986

[86] PCT No.: PCT/JP86/00288

§ 371 Date: Feb. 9, 1987

§ 102(e) Date: Feb. 9, 1987

[87] PCT Pub. No.: WO86/07489

PCT Pub. Date: Dec. 18, 1986

[30] Foreign Application Priority Data

Jun. 10, 1985 [JP] Japan ............................... 60-125363

[51] Int. Cl.[4] ............................................... G11B 5/68

[52] U.S. Cl. ................................ 252/62.54; 428/403; 428/407; 428/328; 428/329; 428/900

[58] Field of Search ............... 428/694, 900, 329, 328, 428/403, 407, 413, 418, 458; 252/62.54; 148/101, 105; 427/128, 131

[56] References Cited

U.S. PATENT DOCUMENTS

| | | | |
|---|---|---|---|
| 2,959,832 | 11/1960 | Baermann | 428/900 |
| 3,359,152 | 12/1967 | Blume, Jr. | 428/900 |
| 3,668,176 | 6/1972 | Childress | 252/62.54 |
| 3,856,581 | 12/1974 | Smeggil | 428/900 |
| 3,933,536 | 1/1976 | Doser | 428/900 |
| 4,042,341 | 8/1977 | Smeggil | 428/900 |
| 4,063,971 | 12/1977 | Klaus | 428/900 |
| 4,543,382 | 9/1985 | Tsuchida | 428/403 |
| 4,550,054 | 10/1985 | Yamauchi | 428/900 |
| 4,601,753 | 6/1986 | Soileau | 428/403 |
| 4,664,723 | 5/1987 | Ishii | 428/900 |
| 4,668,283 | 5/1987 | Honda | 428/403 |

FOREIGN PATENT DOCUMENTS

| | | |
|---|---|---|
| 50-52110 | 5/1975 | Japan . |
| 51-2506 | 1/1976 | Japan . |
| 52-91196 | 8/1977 | Japan . |

*Primary Examiner*—Ellis P. Robinson
*Attorney, Agent, or Firm*—Armstrong, Nikaido, Marmelstein & Kubovcik

[57] ABSTRACT

A magnetic composition which comprises 80 to 95 weight % of ferromagnetic powder, 5 to 20 weight % of highly heat-resistant thermosetting resin powder and 0.1 to 1 weight % of a metal chelate compound. Further, a process characterized in that all of the powders which comprise the magnetic composition are mixed together and molded under heat and pressure to produce a magnetic molding.

The magnetic composition enables molding of materials of complicated form at low temperatures, and the obtained magnetic moldings are excellent in heat resistance, mechanical strength, mechanical workability and initial magnetic permeability.

2 Claims, No Drawings

RESIN-BONDED MAGNETIC COMPOSITION AND PROCESS FOR PRODUCING MAGNETIC MOLDING THEREFROM

TECHNICAL FIELD

The present invention relates to a magnetic composition to be used as a magnetic core for a transformer or for high-frequency welding of a laminated tube and a process for producing a magnetic molding from the magnetic composition, and more particularly to a resin-bonded magnetic composition prepared by bonding magnetic powder with synthetic resin, which enables molding of materials of complicated form at low temperatures, and further which improves heat resistance, mechanical strength, mechanical workability and initial magnetic permeability of obtained moldings and to a process for producing a magnetic molding from the magnetic composition.

BACKGROUND ART

In recent years, in accordance with the diversification and microminiaturization of electronic devices, parts and the like, the developments of magnetic moldings having complicated forms or microstructures are intensily required in various technical fields.

Generally, moldings produced by pressing ferromagnetic powder such as ferrite powder and then sintering the pressed ferromagnetic powder at a high temperature of at least 1000° C. are usually used. However, the moldings are largely contracted when the pressed ferromagnetic powder is sintered, and a great cost for producing is needed since the yield or the like is remarkably lowered when producing moldings having complicated forms or microstructures. Further, such magnetic moldings have many problems that it is difficult to be mechanically processed, that is, the obtained magnetic moldings are easily chipped off and brittle. Therefore, the developments of a resin-bonded magnetic composition having highly effective properties are required to solve these problems in various technical fields.

Hence, a known resin-bonded magnetic composition used as a magnetic core for a transformer and the like is produced by mixing iron powder or ferrite powder with resin components such as polyphenylene sulfide, epoxy resin, polyalkylene terephthalate, polyethylene, polypropylene, polybutene, polyvinyl chloride, ABS resin and AS resin and molding the mixture by hot-pressing.

However, since prior magnetic moldings produced by mixing resin components such as polyphenylene sulfide and epoxy resin and molding the mixture by hot-pressing have many problems in that the heat resistance is not sufficient, the mechanical strength is low and the initial magnetic permeability is low, the range of their uses is limited to a core of a coil used in a toy which does not need high reliabilities and high properties, and the like. Therefore, the fact is that the magnetic moldings have not yet been applied to industrial electronic devices and the like.

As the results of the present inventors' researches, the inventors have eventually found a resin-bonded magnetic composition having excellent heat resistance, moldability, mechanical workability, mechanical strength and initial magnetic permeability and a process for producing a magnetic molding from the magnetic composition, and the present invention was accomplished.

DISCLOSURE OF THE INVENTION

A resin-bonded magnetic composition of the present invention comprises 80 to 95 weight % of ferromagnetic powder, 5 to 20 weight % of highly heat-resistant thermosetting resin powder and 0.1 to 1 weight % of metal chelate compound.

Examples of the above-mentioned ferromagnetic powder are, for instance, ferrite powder, iron powder, Co-compound powder such as borocube, permalloy powder, alnico magnetic powder, neodymium magnetic powder, amorphous magnetic powder, and the like. These powders may be employed alone or in admixture thereof. Among them, since ferrite powder is excellent in moldability, the ferrite powder is preferably used in the present invention. These ferromagnetic powders are usually ground to have a particle size within the range of 50 to 300 mesh.

Examples of the highly heat-resistant thermosetting resin powder are, for instance, prepolymer obtained by reacting a bisimide compound of unsaturated dicarboxylic acid with a polyamine compound having at least two amino groups in the molecule (hereinafter reffered to as addition-polymerization type polyimide), a mixture of the addition-polymerization type polyimide and epoxy resin having at least two epoxy groups in the molecule (hereinafter referred to as epoxy), polyparabanic acid resin, a mixture of the polyparabanic acid resin and the epoxy, and the like. These powders may be employed alone or in admixture thereof. These powders are usually ground to have a particle size within the range of 200 to 1000 mesh.

Examples of the above-mentioned metal chelate compound are, for instance, Al-acetylacetonate, Co-acetylacetonate, Fe-acetylacetonate, Mn-acetylacetonate, Ni-acetylacetonate, Zn-acetylacetonate, Zr-acetylacetonate, and the like. These compounds may be employed alone or in admixture thereof.

Further, in accordance with the process for producing of the present invention, a magnetic molding is produced by molding the magnetic composition comprising 80 to 95 weight % of ferromagnetic powder, 5 to 20 weight % of highly heat-resistant thermosetting resin powder and 0.1 to 1 weight % of metal chelate compound under heat and pressure.

The above-mentioned heat is applied at 150° to 250° C. and the pressure is applied at 0.5 to 3 t/cm$^2$ and then the composition is preferably molded by, e.g., hot-pressing.

The preferable resin-bonded magnetic composition of the present invention comprises (1) 80 to 95 weight % of ferrite powder, (2) 5 to 20 weight % of addition-polymerization type polyimide resin powder and (3) 0.1 to 1 weight % of metal chelate compound. Particularly, it is more preferable that the ferrite powder is ferrite fines having a particle size of at most 500 mesh, the polyimide resin powder is prepolymer powder obtained by reacting a bisimide compound of unsaturated dicarboxylic acid with a polyamine compound having at least two amino groups in the molecule, and the metal chelate compounds are, for instance, Al-acetylacetonate (hereinafter the acetylacetonate is referred to as AA), i.e., $Al(AA)_3$, $Fe(AA)_3$, $Mn(AA)_3$ and/or $Ni(AA)_2$.

As mentioned above, when the ferrite powder is bonded with resins, since there have been many problems with respect to heat resistance, mechanical strength and initial magnetic permeability, the composition has not yet satisfied the requirements for practical uses in various technical fields. Generally, synthetic resin used as a binder of the magnetic composition is unsuitable since the kinds of the synthetic resin are limited in accordance with their characteristics and particularly, thermoplastic resin is deformed when being heated. Among the thermosetting resins, widely used phenol resin and epoxy resin can not be sufficiently tolerant of heat shock or thermal cycle shock over a long period of time since their maximum heat resisting temperature is about 100° to 180° C. Among the resins, although polyimide resins are most excellent in heat resistance (the maximum heat resisting temperature of the polyimide resins are not less than 250° C.), most of all polyimide resins show condensation reactions when these resins are subjected to curing conditions and gases such as aqueous vapour are generated in the process of curing these resins. Further, when the magnetic composition containing the polyimide resin is subjected to compression molding by means of hot-pressing, holes are generated in an obtained molding and these holes become large obstacles for improving mechanical strength and magnetic permeability. Therefore, resins which can solve these problems are highly heat-resistant thermosetting resin in which gases such as aqueous vapour are not generated when being cured. Among them, highly heat-resistant addition-polymerization type polyimide resin and polyparabanic acid resin are particularly preferably used. This is one of the characteristics of the present invention.

Examples of the polyimide resin are, for instance, polyaminobismaleimide resin (e.g., Kerimid 601; maximum heat resisting temperature: at least 250° C., produced by Nippon Polyimide Co., Ltd.), and the like. In the present invention any prepolymer produced by reacting a bisimide compound of unsaturated dicarboxylic acid and a polyamine compound having at least two amino groups in the molecule may be used as a thermosetting polyimide resin.

The mechanical strength of the magnetic composition, in case that a resin is applied as a binder of ferromagnetic powder such as ferrite powder, is as follows.

Generally the, ferromagnetic powder is a powder which is produced by powdering sintered products of oxide of Fe, Mn, Ni, Zn, Co or the like. On the surface of the particle, functional groups of chemically unstable metal oxide are not usually present (it is generally reputed that a fine particle of carbon black or titanium oxide has functional groups on the surface). Therefore, although in case of employing epoxy resin which is most excellent in adhesive strength with other materials of all resins as a binder of the ferromagnetic powder, it is very difficult to produce a molding having excellent mechanical strength since strong chemical bonds between the resin and the surface of ferromagnetic powder can not be obtained. Also, this can be said in case of employing polyimide resin which is recently given attention to engineering plastic and which can not be duplicated by any other resins in mechanical strength.

Another characteristic of the present invention is that metal chelate compound is employed to improve the adhesion of ferromagnetic powder and highly heat-resistant thermosetting resin powder. That is, in the resin-bonded magnetic composition of the present invention it is possible to improve the mechanical strength of magnetic moldings by bonding metal components of the metal chelate compound and metal components of the ferromagnetic powder by employing a mixture of one or more components of $Al(AA)_3$, $Fe(AA)_3$, $Mn(AA)_3$ and $Ni(AA)_2$ as a metal chelate compound and further by introducing these chelate compounds chemically into a skeletal structure of the addition-polymerization type highly heat-resistant thermosetting resin.

Further, although the curing temperature of highly heat-resistant thermosetting resin is usually at least 250° C., when a slight amount of metal chelate compounds is added in the resin, complex metals in the metal chelate compounds act as a catalyst and the complex metals promote the lowering of the curing temperature of the highly heat-resistant thermosetting resin, and it tends to lower the curing temperature in accordance with an increase in the amount of metal chelate compound. However, in case the amount of the metal chelate compound is increased without any fixed principle, excess metal chelate compound which is not introduced into the cured polymer compound comprising highly heat-resistant thermosetting resin remains and the residual metal chelate compound acts as an impurity which deteriorates electric and physical properties. Therefore the used amount of the metal chelate compound is about 0.5 to 5 weight % of the synthesized resin and about 0.1 to 1 weight % of the magnetic composition.

The process to give high magnetic permeability to a magnetic molding is as follows.

For instance, when ferrite powder is employed as ferromagnetic powder and the ferrite powder is bonded with resins, in order to improve magnetic permeability of an obtained molding, generally it is necessary to shorten the distance between ferrite particles and to enlarge the diameter of the ferrite particles to propagate the magnetic waves as smooth as possible. However, prior resin-bonded magnetic compositions which are produced on the basis of the above-mentioned theory have a problem in that the loss of high-frequency is very large, as well as the above-mentioned various defects. It is considered that the main cause of the problems that the loss of high-frequency is very large is in a thought against the form of the magnetic wave propagation in the molding. Recently, the theory of the magnetic wave transmission in a magnetic molding has been changed and amorphous magnetic substances rather than crystalline substances or sintered products have been focused on. In fact, it has been found that the amorphous magnetic material is excellent in various electric properties.

Therefore one of the last characteristics of the present invention is that the metal chelate compound contained as a component with the ferrite powder in the composition is used as a bonding reinforcement agent for ferrite powder and polyimide resin and as a low temperature curing catalyst of the resin, and that the complex metal in the metal chelate compound is used as a medium which transfers magnetic waves smoothly by including a complex metal between ferrite powder particles.

As mentioned above, by employing addition-polymerization type polyimide resin powder and metal chelate compound as a bonding agent of ferromagnetic powder such as ferrite powder, a resin-bonded magnetic composition which has excellent heat resistance, mechanical strength and magnetic permeability and a process for producing a magnetic molding from the magnetic ocmposition of the present invention have been established.

A molding in which the resin-bonded magnetic composition of the present invention is used has a merit that the molding has excellent heat resistance, mechanical strength and initial magnetic permeability. Further, the above-mentioned composition can be molded at relatively lower temperatures.

Therefore, when employing the molding of the magnetic composition of the present invention as a magnetic core for a transformer or for high-frequency welding of a laminated tube, since a magnetic body which can transfer with high efficiency a magnetic wave having few loss in the range of a low-frequency (several 10 Hz) to a high-frequency (several MHz) can be relatively easily obtained, the utilities and effects are enlarged widely in the industry.

Also, since the obtained molding from the composition of the present invention is easily cut with a cutting machine tool or the like, a molding having a complicated form can be easily produced.

BEST MODE FOR CARRYING OUT THE INVENTION

The present invention will be explained by referring to Examples. In the following Examples, the present invention is not limited to the combination of the used substances and reactions.

1. EXAMPLES 1 TO 9

(1) 50 mole % of $Fe_2O_3$ powder, 35 mole % of ZnO powder and 15 mole % of NiO powder were dispersed and mixed together sufficiently in an automatic mortar of alumina. After the mixed powder was baked at 1300° to 1400° C. for two hours, the mixed powder was finely ground (to at most 300 mesh) with the automatic mortar of alumina and a stamp mill to give ferrite powder used in experiments (hereinafter referred to as A).

(2) A metal chelate compound (produced by DOJIN CHEMICAL Laboratory) comprising $Al(AA)_3$:$Fe(AA)_3$:$Mn(AA)_3$:$Ni(AA)_2$ in a weight ratio of 1:1:1:1 (hereinafter referred to as B) was prepared.

(3) A heat curable prepolymer powder (Kerimid 601 produced by Nippon Polyimide Co., Ltd., hereinafter referred to as C) was prepared by adding diaminodiphenylmethane to the double bond of bismaleimide obtained by reacting maleic anhydride with diaminodiphenylmethane.

Then after the prescribed amounts of A, B and C were dispersed and mixed together sufficiently with an automatic mortar of alumina, the mixture was molded and cured to a desired form by hot-pressing.

In case that a sample was used for measuring magnetic permeability, the molding was processed to have a size such that the inside diameter was 40 mm, outside diameter was 50 mm and the thickness was 10 mm, and in case that a sample was used for measuring mechanical strength, the molding was processed to have a size such that the width was 5 mm, the length was 50 mm and the thickness was 3 mm.

The condition of the hot-pressing was that the heating temperature was 150° to 250° C. and the applied pressure was 0.5 to 3 t/cm$^2$. The curing condition was decided by using a thermal analysis apparatus (TG or DTA) and an infrared spectrophotometer. The applied pressure was increased or decreased in accordance with the amount of the used resin component.

The flexural strength, initial magnetic permeability, heat resistance and mechanical workability of nine kinds of moldings (Examples 1 to 9) obtained by changing the above-mentioned amount of B and C, curing temperature and pressure of hot-pressing were measured in accordance with the following manners. The results were shown in Table 1.

Furthermore, as Comparative Examples, a sintered product consisting of A (Comparative Example 4), a molding comprising A in which 5 weight % of epoxy resin was added (Comparative Example 5) and a mold consisting of A and C (Comparative Examples 1 to 3) were prepared and their properties were measured in the same manner as in Examples 1 to 9. The results were shown in Table 1.

2. EXAMPLES 10 TO 15

(1) Marketed ion powder, borocube powder (CO-compound powder), permalloy powder, amorphous magnetic powder, alnico magnetic powder and neodymium magnetic powder were finely powdered again (to at most 300 mesh) to give magnetic powder used in the experiments (hereinafter referred to as A').

(2) As metal chelate compounds, metal chelate compounds which were the same as in Examples 1 to 9 (hereinafter referred to as B) were used.

(3) As a binder, Kerimid 601 produced by Nippon Polyimide Co., Ltd. was used (hereinafter referred to as C).

Then these materials were heated and compression molded in the same manner and size as in Examples 1 to 9 to give various samples for evaluating their properties. The results were shown in Table 2.

(Flexural Strength)

Flexural strength is measured in accordance with JIS R 2213 (Test Method for Modulus of Rupture of Refractory Bricks).

(Initial Magnetic Permeability)

Initial magnetic permeability is measured in accordance with JIS C 2561 (Measuring methods for Fundamental Properties of Soft Ferrites).

(Heat Resistance)

Heat resistance is measured in accordance with JIS K 6911 (Testing Methods for Thermosetting Plastics).

(Mechanical Workability)

Mechanical workability is measured when a sample is subjected to lathing with a carbide tool.

TABLE 1

| | | | | | | Physical properties | | | |
|---|---|---|---|---|---|---|---|---|---|
| | Amount of A (weight %) | Amount of B (weight %) | Amount of C (weight %) | Condition of curing (°C.) | Pressure (t/cm$^2$) | Flexural strength (kg/mm$^2$) | Initial magnetic permeability $\mu_1$(H/m) | Heat resistance (°C.) | Mechanical workability |
| Example No. | Ferrite powder | | | | | | | | |
| 1 | 94.9 | 0.1 | 5 | 170 | 3 | 5.4 | 18.4 | At least 200 | Possible to be cut |
| 2 | 89.9 | 0.1 | 10 | 190 | 1 | 9.7 | 10.1 | " | " |
| 3 | 79.9 | 0.1 | 20 | 220 | 0.5 | 15.8 | 7.7 | " | " |
| 4 | 94.5 | 0.5 | 5 | 150 | 2 | 4.5 | 21.2 | " | " |

TABLE 1-continued

| | | | | | | Physical properties | | | |
|---|---|---|---|---|---|---|---|---|---|
| | Amount of A (weight %) | Amount of B (weight %) | Amount of C (weight %) | Condition of curing (°C.) | Pressure (t/cm$^2$) | Flexural strength (kg/mm$^2$) | Initial magnetic permeability $\mu_1$(H/m) | Heat resistance (°C.) | Mechanical workability |
| 5 | 89.5 | 0.5 | 10 | 150 | 1 | 12.4 | 15.2 | " | " |
| 6 | 79.5 | 0.5 | 20 | 160 | 0.5 | 17.3 | 11.6 | " | " |
| 7 | 94 | 1.0 | 5 | 150 | 2 | 4.3 | 23.4 | " | " |
| 8 | 89 | 1.0 | 10 | 150 | 1 | 11.9 | 20.3 | " | " |
| 9 | 79 | 1.0 | 20 | 150 | 0.5 | 19.4 | 14.1 | " | " |
| Com. Ex. | | | | | | | | | |
| 1 | 95 | 0 | 5 | 250 | 3 | 3.2 | 12.0 | " | " |
| 2 | 90 | 0 | 10 | 250 | 1 | 7.6 | 7.3 | " | " |
| 3 | 80 | 0 | 20 | 250 | 0.5 | 12.3 | 3.2 | " | " |
| 4 | 100 | 0 | 0 | 1300 | 2 | 9.3 | 55.6 | At least 500 | Impossible to be cut |
| 5 | 95 | 0 | Epoxy 5 weight % | 150 | 2 | 2.4 | 11.4 | At least 120 | Possible to be cut |

TABLE 2

| | | | | | | Physical properties | | | |
|---|---|---|---|---|---|---|---|---|---|
| Example No. | Amount of A' (weight %) | Amount of B (weight %) | Amount of C (weight %) | Condition of curing (°C.) | Pressure (t/cm$^2$) | Flexural strength (kg/mm$^2$) | Initial magnetic permeability $\mu_1$(H/m) | Heat resistance (°C.) | Mechanical workability |
| 10 | Ferrite powder 92.9 | 0.1 | 7 | 200 | 2 | 5.7 | 7.8 | At least 200 | Possible to be cut |
| 11 | Co-compound powder 92.9 | 0.1 | 7 | 200 | 2 | 8.2 | 31.4 | " | " |
| 12 | Permalloy powder 92.9 | 0.1 | 7 | 200 | 2 | 10.3 | 44.3 | " | " |
| 13 | Amorphous powder 92.9 | 0.1 | 7 | 200 | 2 | 12.5 | 17.5 | " | " |
| 14 | Alnico magnetic powder 92.9 | 0.1 | 7 | 200 | 2 | 4.3 | Residual magnetic flux density 700 G | " | " |
| 15 | Neodymium magnetic powder 92.9 | 0.1 | 7 | 200 | 2 | 6.6 | Residual magnetic flux density 700 G | " | " |

We claim:

1. A magnetic molding composition consisting essentially of a mixture of 80 to 95 weight % of ferromagnetic powder, 5 to 20 weight % of highly heat-resistant thermosetting resin powder and 0.1 to 1 weight % of at least one metal chelate compound, wherein said resin powder is at least one resin powder selected from the group consisting of: (1) a prepolymer obtained by reacting a bisimide compound of an unsaturated dicarboxylic acid with a polyamine compound having at least two amino groups in the molecule, (2) a mixture of said prepolymer and an epoxy resin having at least two epoxy groups in the molecule, (3) a polyparabanic acid resin and (4) a mixture of said polyparabanic acid resin and said epoxy resin, and wherein said metal chelate compound is selected from the group consisting of Al-acetylacetonate, Co-acetylacetonate, Fe-acetylacetonate, Mn-acetylacetonate, Ni-acetylacetonate, Zn-acetylacetonate and Zr-acetylacetonate.

2. The magnetic molding composition of claim 1, wherein the ferromagnetic powder is at least one powder selected from the group consisting of ferrite powder, iron powder, Co-compound powder, permalloy powder, alnico magnetic powder, neodymium magnetic powder and amorphous magnetic powder.

* * * * *

UNITED STATES PATENT AND TRADEMARK OFFICE
CERTIFICATE OF CORRECTION

PATENT NO. : 4,808,326

DATED : February 28, 1989

INVENTOR(S) : TANINO et al

It is certified that error appears in the above-identified patent and that said Letters Patent is hereby corrected as shown below:

On the cover page, Item [75], line 2, "Takeo Kizaki" should read --Takao Kizaki--.

Signed and Sealed this

Twenty-third Day of January, 1990

*Attest:*

JEFFREY M. SAMUELS

*Attesting Officer* — *Acting Commissioner of Patents and Trademarks*